United States Patent
Hahn

(10) Patent No.: US 8,223,204 B2
(45) Date of Patent: Jul. 17, 2012

(54) MANEUVERING AID AND METHOD FOR AIDING DRIVERS OF VEHICLES OR VEHICLE COMBINATIONS COMPRISING ARTICULATED VEHICLE ELEMENTS

(75) Inventor: Stefan Hahn, Ulm (DE)

(73) Assignee: Daimler AG, Stuttgart (DE)

( * ) Notice: Subject to any disclaimer, the term of this patent is extended or adjusted under 35 U.S.C. 154(b) by 486 days.

(21) Appl. No.: 12/529,045

(22) PCT Filed: Mar. 3, 2008

(86) PCT No.: PCT/EP2008/001671
§ 371 (c)(1),
(2), (4) Date: Aug. 28, 2009

(87) PCT Pub. No.: WO2008/107148
PCT Pub. Date: Sep. 12, 2008

(65) Prior Publication Data
US 2011/0001825 A1      Jan. 6, 2011

(30) Foreign Application Priority Data
Mar. 6, 2007 (DE) .......................... 10 2007 011 180

(51) Int. Cl.
*H04N 7/18* (2006.01)
(52) U.S. Cl. ........................................ 348/148; 348/120
(58) Field of Classification Search ................... 348/148
See application file for complete search history.

(56) References Cited

U.S. PATENT DOCUMENTS
6,411,867 B1   6/2002   Sakiyama
7,295,227 B1   11/2007  Asahi
2005/0128294 A1   6/2005   Green
2007/0027581 A1*  2/2007   Bauer et al. ........................ 701/1

FOREIGN PATENT DOCUMENTS
DE      102005045196 A1   9/2006
(Continued)

OTHER PUBLICATIONS

Zoebel D. "Mathematical Modeling of the Kinematics of Vehicles". Internet Citation, (Online) XP009090696 Retrieved from the Internet: URL: http://www.uni-koblenz.de/Izoebel/pdf/Mamotep.2.pdf> [retrieved on Oct. 10, 2007] the whole document.

*Primary Examiner* — Patrice Winder
*Assistant Examiner* — Ebrahim Golabbakhsh
(74) *Attorney, Agent, or Firm* — Patent Central LLC; Stephan A. Pendorf

(57) ABSTRACT

When maneuvering a vehicle, due to the seated position of the driver, the problem arises that a large portion of the space to the rear of the vehicle to be observed is hidden by the vehicle body itself. Therefore, the vehicle driver is presented with a display of a camera image of the space to the rear of the vehicle with a perspective overlay of the driving path and/or the towing path of the vehicle (1). Said driver support system is configured such that it is also suitable for guiding a vehicle or vehicle combination (1) in which the trailer comprises a plurality of vehicle elements (2, 3) that are bendable relative to one another. In order to detect the steering angle (7) of at least one steerable axis (6) of the vehicle (1), and in order to determine the bending angle (5) between at least two vehicle elements (2, 3) bendable relative to one another, sensors are provided. Using the data regarding the steering and bending angles (5, 7) and taking into account at least the geometry of the vehicle (1), the future driving path of the vehicle (1) is predicted in the processor module for the limits of the driving path and/or towing path and is superimposed on the image data captured by the camera. The image data thus processed is then displayed to the driver of the vehicle (1) on a display as a maneuvering aid.

26 Claims, 3 Drawing Sheets

FOREIGN PATENT DOCUMENTS

Figure 1:
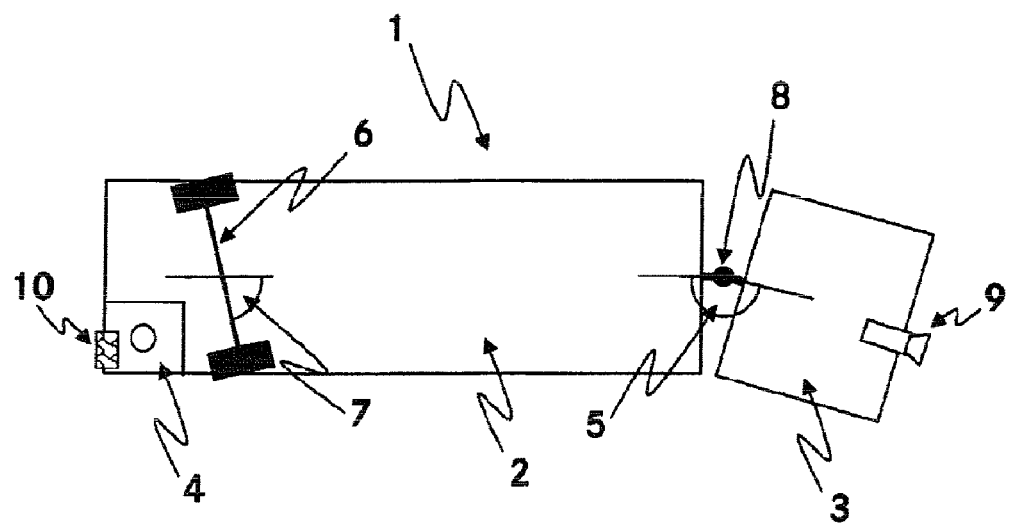

| | | |
|---|---|---|
| EP | 1022903 A2 | 7/2000 |
| EP | 1102226 B1 | 7/2005 |
| GB | 2398048 A | 8/2004 |
| WO | 2008012109 A2 | 1/2008 |

* cited by examiner

MANEUVERING AID AND METHOD FOR AIDING DRIVERS OF VEHICLES OR VEHICLE COMBINATIONS COMPRISING ARTICULATED VEHICLE ELEMENTS

The invention relates to a maneuvering aid for vehicles and vehicle combinations, which have partial sections which can be moved relative to one another according to the preamble of claim 1, and a corresponding method.

When guiding a vehicle, it is necessary for avoiding accidents that the vehicle driver can view the surroundings of the vehicle as optimal as possible. The sensing of the vehicle surroundings thereby essentially takes place by visual check by the vehicle driver. Especially when maneuvering a vehicle, there is the problem due to the seating position of the driver that a large part of the vehicle rear space to be viewed is covered by the vehicle body itself. Diverse mirror and lens constructions for mounting to the vehicle are known for solving this problem. It has also been suggested recently to sense the rear space of the vehicle with the aid of a camera device and to display the image data obtained thereby on a display in the dashboard well visible for to vehicle driver.

50 as to further support the vehicle driver in addition to the camera image display during reversing, a maneuvering aid for motor vehicles is suggested in the documents EP 1 022 903 A2 and EP 1 102 226 B1, especially for entering parking spaces. For this, the vehicle driver is presented with a camera image of the rear space on a display, on which the predicted route is displayed in a superimposed manner, starting from the sensed steering angle of the vehicle.

It is the object of the invention to create an improved maneuvering aid, which can be used for a wide spectrum of motor vehicles.

The object is solved by a device and method with the characteristics of claims 1 and 18. Advantageous arrangements and further developments of the invention are described by the dependent claims.

The system for aiding drivers of vehicles during maneuvering is designed in such a manner that it is also suitable for guiding a vehicle or a vehicle combination (1), where this vehicle consists of several vehicle elements (2, 3) that are bendable relative to one another. For this, the rear environment of the vehicle (1) is sensed by a camera.

One or several sensors are arranged and/or formed to sense the arrangement condition of the vehicle and/or the vehicle elements, especially the relative position of the vehicle elements to one another, and the wheel adjustment. For example, sensors are used for sensing the steering angle (7) of at least one steerable axis (6) of the vehicle (1), and for determining the bending angle (5) between at least two vehicle elements (2, 3) that bendable relative to one another. These sensors can very well be mechanical or electromechanical sensors. It is alternatively also possible to estimate the conditions of the bending angles via an internal model or a control-oriented observer. It is also very well feasible that the sensor for sensing the bending angle (5) between at least two vehicle elements or the steering angle (7) is based on a sensor sensing the environment, especially a camera or a radar/lidar, and the updated bending angle (5) or steering angle (7) is estimated starting with the environmental data sensed thereby, it would very well be feasible to provide one of the two vehicle elements (2, 3) that are bendable relative to one another with a camera, and to determine the bending angle from the image data of the other vehicle element sensed therewith (analogous to this, a radar or lidar system could be used).

The image data sensed with the camera and the determined arrangement conditions, especially the steering and bending angles, are supplied to a processor module. This processor module consists at least of one unit for the image data processing, and at least one memory containing the measurements of the geometry, especially the circumferential geometry (1) of the vehicle (1).

It is of course advantageous with the device for maneuvering, if all steering and bending angles (5, 7) of the vehicle (1) are sensed and processed in the processor module. At the same time, it is also very well feasible to only sense and consider the especially strongly varying steering or bending angles. With such a restricted arrangement of the invention, a more tolerable acceptable prediction of the driving path for short distances can generally also take place.

According to the invention, a determination module is suggested as part of the processor module, which is formed for the determination of a rectifiable condition of the vehicle, preferably when using the sensed arrangement conditions and/or the measurements of the geometry of the vehicle for an updated position and/or for at least one predictable position of the vehicle. A rectifiable condition is defined as a condition from which the vehicle can be aligned in a straight manner within a driving distance of e.g. less than four, three or two vehicle lengths. The rectifiable condition is preferably defined as a combination of arrangement conditions, especially as a combination of bending and drawbar angles.

The invention is thereby based on the deliberation that, with conventional maneuvering aids, the vehicles often guide into arrangement conditions from which—especially when reversing—a straightening of the vehicle is not possible or not possible within acceptable driving distances. There is thus the danger with the conventional systems that the vehicles are piloted to "one way situations", from which the vehicles can only escape with a forward drive. An improvement of the invention can be seen in that the device controls if the vehicle is in such a "one way situation" and/or in a predicting position of the vehicle.

In a particularly advantageous manner, the memory containing the geometric measurements of the vehicle (1) is designed in such a manner that several different vehicle geometries can be stored therein simultaneously. In this manner, it is possible in a very easy manner to adapt the system for aiding drivers during maneuvering to changes of the vehicle geometry (e.g. new trailer, other constructions etc). These changes can be taken on by the system without great technical effort, by for example entering the corresponding data of the new measurements into the memory of the (mobile and/or stationary) data processing unit. With a corresponding embodiment, this can especially also take place in a wireless manner. In the case of (the same) changes repeating often (e.g. travel with loaded or unloaded container), several different vehicle contours or measurements can also be contained in the memory of the data processing unit and can possibly also be recalled manually.

So as to be able to present the vehicle driver with a view of the rear environment as comprehensive as possible, the use of an omnidirectional (cathadioptic) camera is provided. The number of the cameras necessary for the rear space surveillance can be minimized by this.

Preferably, especially the steering and bending angle (5, 7), and with knowledge at least of the geometry of the vehicle (1), the future driving path of the vehicle (1) is predicted within the breadth of its driving path (21, 32, 33) and/or its towing path (22, 33, 34), and superimposed by the image data received by the camera in a perspectively correct, symbolic manner. The image data processed in this manner are subsequently shown to the driver of the vehicle (1) on a display for the maneuvering aid.

For displaying the image data superimposed with the data of the driving path (21, 31, 32) and/or the towing path (22, 33, 34), displays present in the region of the dashboard are especially suitable or also head-up displays, where the image data to be depicted are projected to surfaces present in the vehicle, especially the windscreen. At the same time, the integration of the image display in one or in the region of a rear view mirror of the vehicle (1) can also be provided. This has the advantage that the image display takes place at locations which already have to be viewed by the vehicle driver during driving the vehicle (1); a combination of rear view mirror and camera image display thus leads to an ergonomic improvement of the maneuvering aid.

In a preferred embodiment of the invention, indications regarding the rectifiable condition of the vehicle are depicted for the updated position and/or for the predicted position on the display unit. The indication can e.g. be embodied as a color change in the display unit. This indication can for example also take place by a warning device, which emits an optical, acoustic or haptic warning signal, if the vehicle in the updated and/or the predicted position of the vehicle is in a non-rectifiable condition.

In a preferred further development of the invention, the future driving path of the vehicle is predicted while considering and/or weighting the rectifiable conditions. Driving paths proceeding along trajectories with positions of rectifiable conditions are especially preferred with the prediction, e.g. via an evaluation function. With this further development, it is considered especially that the predicted driving paths are very sensible with regard to small changes of the steering angle, so that more stable results or predictions can be generated by considering the rectifiable conditions. Additionally, the actual bending and drawbar angles cannot be estimated or only estimated with difficulty by means of the prediction.

In a further embodiment of the invention, the depiction on the display unit is improved in that a first driving path section is shown, which was predicted and/or extrapolated using the updated steering angle and is only depicted as long as this is congruent with a trajectory with positions of rectifiable conditions at this steering angle.

In a further development of the invention, the end point of the first driving path section is defined as deviation point and describes the position of the vehicle, at which the vehicle leaves the trajectory with positions of rectifiable conditions with a constant steering angle and/or passes to a non-rectifiable condition. At least a second driving path section is arranged at this deviation point in a data-technical manner and depicted on the display unit, wherein this second driving path section is predicted for an optimized steering angle.

The second driving path section proceeds especially along a trajectory of rectifiable positions for the optimized steering angle. The choice of the optimized steering angle can thereby be formed in such a manner that the second driving path section is positioned at the boundary of a field of rectifiable conditions for all possible steering angles.

In a further development of the invention, a band of second driving path sections is applied in a data-technical manner at the deviation point and depicted on the display unit, wherein these second driving path sections are predicted for different steering angles. In this manner, different options for the drive after deviation point are suggested to the driver of the vehicle.

The system according to the invention is described in detail in the following with the help of figures. It shows thereby FIG. 1 the schematic assembly of the system with the example of an articulated bus, FIG. 2 an exemplary depiction of the driving path, FIG. 3 a version of the driving path depicted in FIG. 2, FIG. 4 a further version for the depiction of a driving path.

FIG. 1 schematically shows an articulated bus (1) consisting of two vehicle elements (2, 3) bendable relative to one another; the outer wall connection ("concertina") of the vehicle elements is not shown. The driver's seat (4) with an image display (10) is also in the larger vehicle element (2). The two vehicle elements (2, 3) are coupled to each other by a joint (8). If a vehicle driver carries out a steering movement during the driving of the articulated bus (1), this results in a change of the bending angle (5) which can be measured at the joint (8). The steering angle (7) at the steerable axis (6) of the articulated bus (1) resulting from the steering movement can be sensed with suitable means and can, together with the bending angle (5) and the image data of the camera (9) be supplied to the processor unit of the system for aiding the driver.

Figure 2:
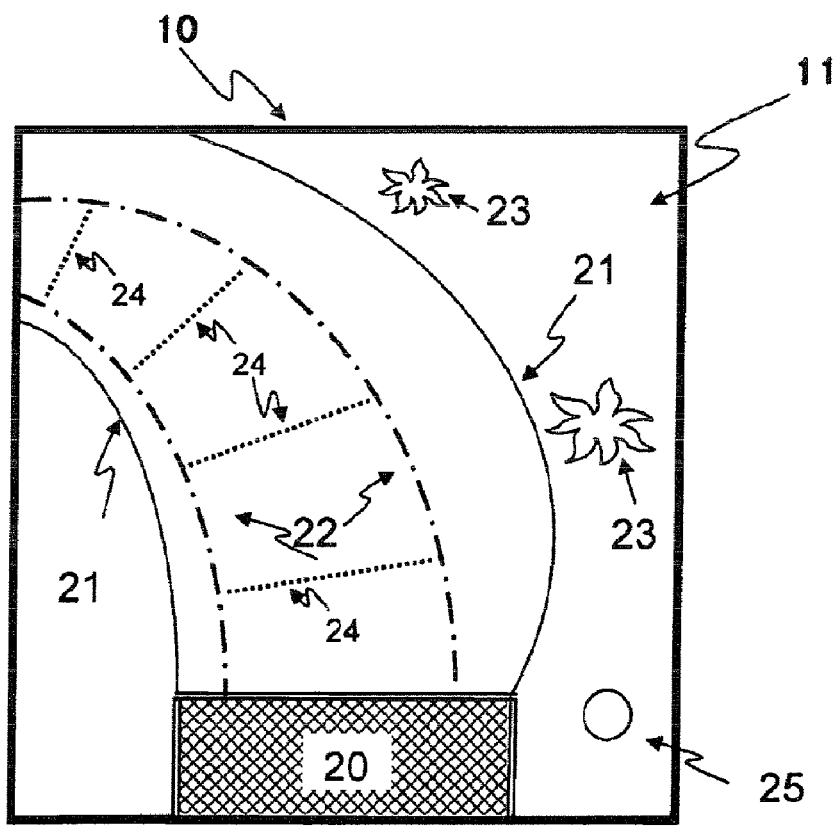

FIG. 2 shows a camera image (11) on the image display (10) processed in the processor module in an exemplary manner. The camera image (11) comprises especially a part (20) of the vehicle, and the contours (21) of the towing path and the driving paths (22) of two wheels. Two objects (23) are additionally reproduced in the camera image (11), for example plants. In a particularly advantageous arrangement of the invention, the processor module also comprises means for the classification of the objects reproduced in the image data, wherein these should be determined in an especially lucrative manner by the classification unit additionally in their position and geometry and be checked with regard to their traversability; traversable are for example manhole covers or low road curbs, while plants or significantly raised structures (walls) cannot be traversed. In a particularly advantageous arrangement of the invention, one or several distance lines (24) are shown within the scope of the depiction of the towing path (21) or a driving path (22), which distance lines aid the driver with the estimation of distances from the image depiction. The distance between the distance lines (24) with regard to the real surroundings is preferably chosen with the same distance. As shown in FIG. 2, it is thereby feasible to display the distance lines (24) over the entire depicted predicted path, or to restrict the display to a certain distance. It would be feasible for this to choose the restriction and the number of depicted distance lines (24) dependent on the speed, especially the design that the display is restricted to a lower distance with lower speeds. It would also feasible in a lucrative manner to keep the number of the depicted distance lines constant independent of the distance made visible by the distance lines (24) in an improved manner. A warning display (25) emits a warning signal to the driver, as soon as the vehicle (20) is driven into a non-rectifiable condition. A non-rectifiable condition is an arrangement condition of the vehicle (20), from which the vehicle cannot be straightened during reversing within a distance of two vehicle lengths. Straightened here means a bending angle (5) of 180° according to FIG. 1.

Figure 3:
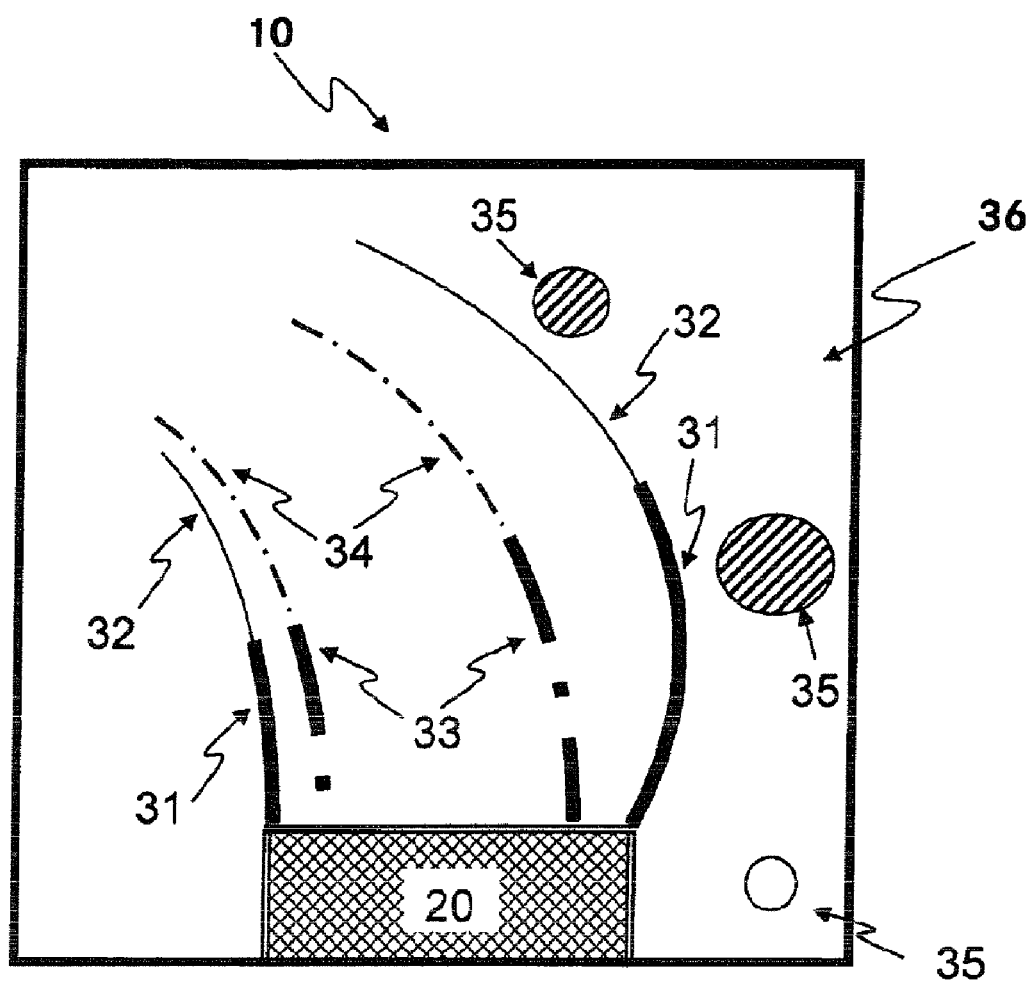

FIG. 3 shows a version of the depiction shown in FIG. 2 of the image data processed in the processor module. The image data (36) depicted on the image display (10) according to FIG. 3 also contain a part (20) of the vehicle, and the contours (21) of the towing path and the driving paths (22) of two wheels. Contrary to FIG. 2, the contours (21) and the driving paths (22) were hereby not guided up to the edge of the display field of the image display (10), but were restricted to a certain distance region. A restriction to a partial region can be especially provided, in which a prediction of the paths to be indicated can still take place in a sensible manner, or in which the prediction still lies within a certain distribution bandwidth; it is especially remarkable here that the bending angles between vehicle elements (2, 3) with articulated vehicles (1) to be observed are already subject to strong variants within a short maneuvering distance'

The display of the driving path (21, 31, 32) and/or towing path (22, 33, 34) additionally takes place in a stepped manner in different arrangement versions (31, 32 or 33, 34) in the example depicted in FIG. 3. In addition to such a different line design, it is of course also possible to use different color arrangements. In this manner, especially different distance regions can be accentuated in a simple and initial manner; it would also be feasible to accentuate steps of different distribution bandwidths of the prediction in this manner. In FIG. 3 is also arranged a warning display (35) which passes indications about non-rectifiable conditions of the vehicle (20) to the driver analogous to the warning display (25) in FIG. 1.

The objects in the rear space of the vehicle (1) still shown in the image data (11) in a representational manner were superimposed by symbols (hatched circles) in the image data (36). In this manner, the driver is warned about objects without being distracted by unnecessary detailed information. If one of the objects would have been classified as traversable, it would also be feasible to 'remove' this object from the image data by suitable image processing, so as to free the depiction from 'irrelevant' objects.

In the examples shown in FIGS. 2 and 3, the driving paths (21, 31, 32) of only two wheels was plotted. At the same time, it is also feasible to display the driving paths of all wheels of the vehicle (1). In another arrangement of the invention, in a particularly advantageous manner for better clarity of the depiction, only those driving paths (21, 31, 32) of the wheels could be shown which have the furthest distance vertical to the updated predicted driving path. Such a depiction would already ensure a safe driving path, even if the driving path of one of the wheels would extend out of the region of the towing path during the progress of the maneuvering. It would also be feasible in an advantageous arrangement of the invention to depict the predicted movement path of one or several corners of the vehicle in a supplemental or alternative manner.

Figure 4:
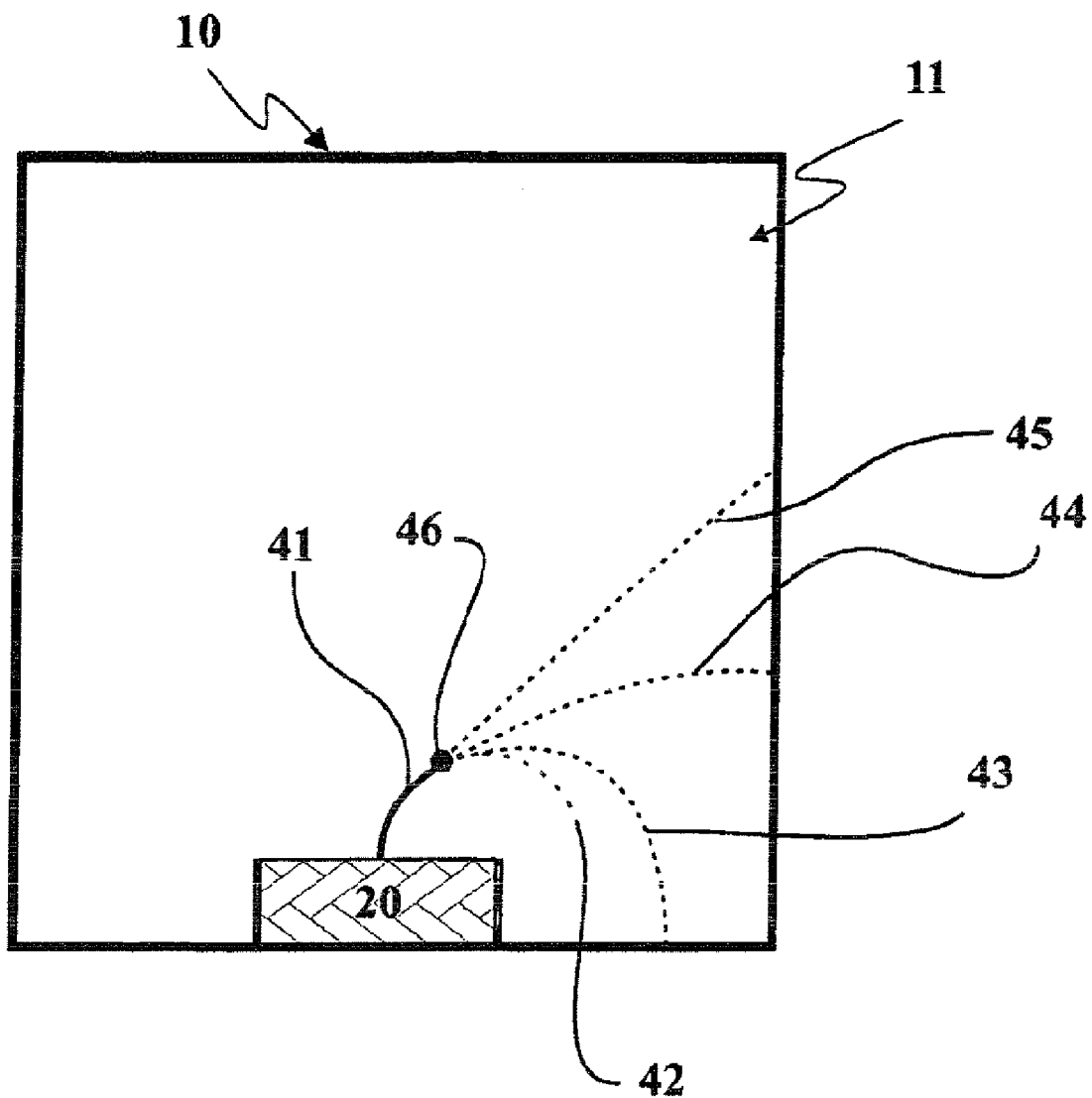

FIG. 4 shows a further possibility of the camera image (11) on the image display (10) processed in the processor module in a schematic depiction. The camera image again shows a part (20) of the vehicle and a plurality of schematic paths (41), (42), (43), (44) and (45), which can be replaced with the corresponding contours (21) of the towing path and the driving path (22) in the practical implementation.

The path (41) connected directly to the vehicle (20) is a first driving path section, which was predicted on the basis of the steering angle (7) and the bending angle (5). The path (41) ends in a deviation point (46), wherein the deviation point is defined in that the path (41) proceeds on a trajectory of positions with rectifiable conditions of the vehicle (20) up to the deviation point (46). The deviation point (46) thus depicts the boundary to a region with positions of non-rectifiable conditions. The path (41) is continued in FIG. 4 as path (42) in a dotted manner for illustration, wherein the path (42) proceeds on a trajectory with positions of non-rectifiable conditions of the vehicle (20). In a first operating mode, only the path (41) of the paths (41), (42), (43), (44) and (45) is displayed on the image display (10).

In a second operating mode, the path (43) is shown in addition thereto, which starts in the deviation point (46) and continues the path (41). The path (43) also proceeds on a trajectory of positions of rectifiable conditions, however, wherein an optimized steering angle 5 is adopted instead of the updated steering angle 5. The optimized steering angle is determined in such a manner that the path 43 proceeds at the boundary between positions with rectifiable and non-rectifiable conditions, wherein the trajectory usually approaches a circular arc in an asymptotic manner. In other words, a possible path with an optimized steering angle is suggested to the driver, which is closest to the path (42) with the original steering angle, but which proceeds on a trajectory with positions of rectifiable conditions. The path (43) ends in a region where the vehicle (20) is straightened.

In a third operating mode, further paths (44), (45) are suggested in a supplemental manner, which are calculated on the basis of further steering angles 5, and respectively proceed on trajectories with positions of rectifiable conditions. Here, the driver is thus shown further possibilities for paths by the device, when following these, the vehicle (20) is straightened or can be straightened in the end region.

The invention is suitable for use with tractors or other traction vehicles with one or several trailers, or also with articulated lorries or articulated buses. The invention is especially not restricted to vehicle configurations with only one pivot joint. The use in an articulated tramway set is e.g. possible, where the steering angle of the trailer drawbar and the angle at the coupling point of the drawing vehicle is consulted for calculating the rectifiable positions.

The invention claimed is:

1. A device for aiding drivers when maneuvering a vehicle or vehicle combination (1), where this vehicle consists of a plurality of vehicle elements (2, 3) that are articulated relative to one another, comprising:
    a camera (9) for sensing image data from the rear environment of the vehicle (1),
    one or a plurality of sensors for sensing the arrangement condition of the vehicle and/or the vehicle elements,
    a processor module which is connected to the camera (9) and to the sensor(s), wherein this processor module consists of at least one unit for image data processing, and at least one memory containing the measurements of the geometry, especially the circumferential geometry, of the vehicle (1), and
    a display unit (10) for the display of image data processed in the processor module,
    wherein the processor module comprises a determination module for determining a rectifiable condition of the vehicle for an updated position and/or for at least one predicted position of the vehicle, wherein the rectifiable condition of the vehicle is defined as a condition from which the vehicle can be aligned in a straight manner within a predetermined driving path preferably of less than four, three or two vehicle lengths.

2. The device according to claim 1, wherein the camera (9) is an omnidirectional camera.

3. The device according to claim 1, wherein the sensor(s) comprise at least one sensor for sensing the steering angle (7) of at least one steerable axis (6) of the vehicle (1) and/or at least one sensor for sensing the articulation angle (5) between at least to vehicle elements (2, 3).

4. The device according to claim 3, wherein the sensor for sensing the bending angle (5) between at least two vehicle elements or the steering angle (7) is based on a sensor sensing the environment, especially a camera or a radar/lidar, and the updated articulation angle (5) or steering angle (7) is estimated starting from the environmental data sensed thereby.

5. The device according to claim 1, wherein the memory associated with the processor module is designed in such a manner that the geometries of a plurality of different possible geometries or constellations of the vehicle (1) are stored therein.

6. The device according to claim 1, wherein the processor module comprises a unit for recognizing objects reproduced in the image data.

7. The device according to claim 1, wherein the display (10) is a head-up display.

8. The device according to claim 1, wherein the display (10) is installed in one or in the region of one of the rear view mirrors of the vehicle (1).

9. The device according to claim 1, wherein the processor module is formed to depict indications (25, 35) of the rectifiable condition of the vehicle for the updated position and/or the predicted position on the display unit (10).

10. The device according to claim 1, wherein the processor module is programmed to predict the future driving path (41, 43, 44, 45) of the vehicle (20) within the limits of its driving path (21, 31, 32) and/or its towing path (22, 33, 34), and to depict the image data captured by the camera in a superimposed manner on the display unit in a perspectively correct and/or symbolic manner.

11. The device according to claim 10, wherein the processor module is programmed to predict the future driving path (41, 43, 44, 45) while considering and/or weighting the rectifiable conditions.

12. The device according to claim 10, wherein the processor module is programmed to position the predicted driving path (41, 43, 44, 45) of the vehicle at least partially on trajectories, which are formed by points of rectifiable conditions of the vehicle.

13. The device according to claim 10, wherein the processor module is programmed to predict the future driving path in a first operating mode while using the updated steering angle and/or to extrapolate and to only depict it as a first driving path section (41) for rectifiable positions on the display unit.

14. The device according to claim 10, wherein the processor module is programmed to connect at least a second driving path section (43, 44, 45) to the first driving path section (41) in a second operating mode, wherein the second driving path section (43, 44, 45) is connected to a deviation point (46) where no rectifiable position can be predicted with the updated steering angle (5), and wherein the second driving path section (43, 44, 45) is predicted while using an optimized steering angle and/or is depicted on the display unit (10).

15. The device according to claim 14, wherein the optimized steering angle is designed in such a manner that the second driving path section (43, 44, 45) proceeds along a trajectory of rectifiable positions.

16. The device according to claim 14, wherein a band of second driving path sections (43, 44, 45) is predicted and/or depicted on the display unit, especially while using a plurality of optimized steering angles.

17. The device according to claim 14, wherein the driving path section or the second driving path sections (43, 44, 45) comprise trajectories for straightening the vehicle.

18. A method for aiding drivers when maneuvering a vehicle or a vehicle combination (1), where this vehicle consists of a plurality of vehicle elements (2, 3) that are articulated relative to one another, especially while using a device according to one of the preceding claims, the method comprising:
sensing image data from the rear environment of the vehicle (1) with at least one camera (9),
supplying these image data arc, together with the data about the steering angle (7) of at least one steerable axis (6) of the vehicle, and about the articulation angle (5) at least between two vehicle elements (2, 3), to a processor module, which predicts the future driving path of the vehicle within the limits of its driving path (21, 31, 32) and/or its towing path (22, 33, 34) by means of the data about steering and articulation angles (5, 7) with knowledge of at least the geometry of the vehicle (1), and superimposes the image data received by the camera in a perspectively correct and/or symbolic manner, and
displaying the image data processed in this manner to the driver of the vehicle (1) on a display (10),
wherein rectifiable conditions of the vehicle are deter lined for an updated position and/or for at least one predicted position of the vehicle, wherein the rectifiable condition of the vehicle is defined as a condition from which the vehicle can be aligned in a straight manner within a predetermined driving path preferably of less than four, three or two vehicle lengths.

19. The method according to claim 18, wherein all steering and/or articulation angles (5, 7) of the vehicle (1) are sensed.

20. The method according to claim 18, wherein, within the scope of the superimposition of the image data captured by the camera, the vehicle paths (21, 31, 32) of all wheels of the vehicle are displayed.

21. The method according to claim 18, wherein, within the scope of the superimposition of the image data captured by the camera (9), only the vehicle paths (21, 31, 32) of those wheels are displayed, which are spaced the furthest vertical to the updated predicted vehicle path.

22. The method according to claim 18, wherein the display of the vehicle path (21, 31, 32) and/or the towing path (22, 33, 34) takes place in a limited manner to a distance region.

23. The method according to claim 18, wherein the display of the vehicle path (21, 31, 32) and/or the towing path (22, 33, 34) takes place in a stepped manner in different design versions.

24. The method according to claim 18, wherein parts of the vehicle (1) are reproduced in the image data.

25. The method according to claim 18, wherein objects are recognized in the image data sensed by the camera (9), and are then accentuated during their display.

26. The method according to claim 25, wherein the accentuation takes place by symbolic superimposition of image data representing an object.

* * * * *